(12) United States Patent
Du

(10) Patent No.: US 10,319,311 B2
(45) Date of Patent: Jun. 11, 2019

(54) DISPLAY SYSTEM WITH ADJUSTMENT FOR BRIGHTNESS PERCEIVED BY USER'S EYES

(71) Applicant: Novatek Microelectronics Corp., Hsinchu (TW)

(72) Inventor: Yuan-Jia Du, Shandong Province (CN)

(73) Assignee: Novatek Microelectronics Corp., Hsinchu (TW)

( * ) Notice: Subject to any disclaimer, the term of this patent is extended or adjusted under 35 U.S.C. 154(b) by 90 days.

(21) Appl. No.: 15/441,265

(22) Filed: Feb. 24, 2017

(65) Prior Publication Data

US 2018/0233092 A1 Aug. 16, 2018

(30) Foreign Application Priority Data

Feb. 16, 2017 (CN) .......................... 2017 1 0083501

(51) Int. Cl.
  *G06K 9/00* (2006.01)
  *G09G 3/20* (2006.01)
  *G09G 3/34* (2006.01)

(52) U.S. Cl.
  CPC ......... *G09G 3/3406* (2013.01); *G06K 9/0061* (2013.01); *G06K 9/00228* (2013.01);
  (Continued)

(58) Field of Classification Search
  CPC ........... G09G 3/3406; G09G 2360/144; G09G 2380/10; G06K 9/00228; G06T 2207/30201
  See application file for complete search history.

(56) References Cited

U.S. PATENT DOCUMENTS 7,679,778 B2 * 3/2010 Aoyama ................. G06T 5/009
  358/1.9
2005/0265626 A1 * 12/2005 Endo .................. G06K 9/00228
  382/274

(Continued)

FOREIGN PATENT DOCUMENTS

CN 102938144 2/2013
CN 103247282 8/2013
(Continued)

OTHER PUBLICATIONS

"Office Action of Taiwan Counterpart Application," dated Jul. 4, 2018, pp. 1-6.

*Primary Examiner* — Laurence J Lee
(74) *Attorney, Agent, or Firm* — JCIPRNET

(57) ABSTRACT

A display system, an electronic apparatus and a display adjustment method thereof are provided. The electronic apparatus comprises a display panel, a timing controller circuit and a processing circuit. The display adjustment method of the electronic apparatus comprising: processing, by the timing controller circuit, frame data to be displayed by the display panel; analyzing, by the processing circuit, an image including a face of a person, and comparing an average luminance value of the face area with a threshold to obtain adjustment information with respect to the light perceived by the face; and correspondingly adjusting, by the timing controller circuit, the frame data or at least one display characteristics associated with the frame data according to the adjustment information. Furthermore, the display system comprises the processing circuit for one electronic apparatus, and the display panel and the timing controller for another electronic apparatus.

22 Claims, 7 Drawing Sheets

(52) U.S. Cl.
CPC ............. *G09G 3/20* (2013.01); *G09G 3/2092*
(2013.01); *G06K 9/00832* (2013.01); *G09G
2320/064* (2013.01); *G09G 2320/0626*
(2013.01); *G09G 2354/00* (2013.01); *G09G
2360/144* (2013.01); *G09G 2380/10* (2013.01)

(56) References Cited

U.S. PATENT DOCUMENTS

| | | | | |
|---|---|---|---|---|
| 2009/0226093 | A1* | 9/2009 | Guo | G06K 9/00234 |
| | | | | 382/190 |
| 2011/0025732 | A1* | 2/2011 | Wang | G09G 3/3611 |
| | | | | 345/691 |
| 2015/0371605 | A1* | 12/2015 | Wu | G09G 5/02 |
| | | | | 345/604 |

FOREIGN PATENT DOCUMENTS

| | | | |
|---|---|---|---|
| CN | 105788564 | | 7/2016 |
| CN | 105788564 A | * | 7/2016 |

\* cited by examiner

DISPLAY SYSTEM WITH ADJUSTMENT FOR BRIGHTNESS PERCEIVED BY USER'S EYES

CROSS-REFERENCE TO RELATED APPLICATION

This application claims the priority benefit of China application serial no. 201710083501.4, filed on Feb. 16, 2017. The entirety of the above-mentioned patent application is hereby incorporated by reference herein and made a part of this specification.

BACKGROUND

Field of the Invention

The invention is directed to a display technique and more particularly, to a display system, an electronic apparatus and a display adjustment method thereof.

Description of Related Art

An electronic apparatus of the related art such as a mobile phone or a tablet is capable of detecting ambient brightness by a light sensor installed in the front side of the electronic apparatus. The electronic apparatus of the related art may dynamically adjust the backlight intensity of a display panel of the electronic apparatus according to the ambient brightness. Nevertheless, in some application scenarios, the ambient brightness detected by the light sensor of the electronic apparatus may be different from brightness perceived by a user's eyes, which results in the backlight intensity of the display panel being unsuitable for the user to view. For example, when the backlight intensity of the display panel of the electronic apparatus is correspondingly dimmed based on the low ambient brightness detected by the light sensor of the electronic apparatus, the user's eyes may experience flares caused by the sunlight or other intense light and has difficulty in clearly viewing displayed contents due to the low backlight intensity of the display panel when the user's eyes is in a bright environment.

In detail, when intense light (e.g., sunlight) is incident from outside a vehicle toward the windshield into the cockpit, the intense light generally irradiates only a small area of the cockpit, while most of the cockpit area is still dark (by being compared with the environment outside the vehicle). In such a condition, when the electronic apparatus is placed in the vehicle cockpit and the front side of the electronic apparatus faces the user (who may sit in a driver's seat or another seat), the light sensor in the front side of the electronic apparatus still detects the dark cockpit and cannot sense the intense light since the intense light is from the back side of the electronic apparatus. As a result, the electronic apparatus may dynamically adjust the backlight intensity of the display panel according to a degree of darkness in the vehicle cockpit. In this case, the dimmed display panel is apparently unsuitable for the user to view in the condition that the eyes of the user in the cockpit must be adapted to the environment outside the vehicle which is irradiated by the intense light.

SUMMARY

The invention provides a display system, an electronic apparatus and a display adjustment method thereof capable of correspondingly adjusting frame data or display characteristics associated with the frame data truly according to light perceived by a user's face and/or eyes.

According to an embodiment of the invention, an electronic apparatus is provided. The electronic apparatus includes a display panel, a timing controller circuit and a processing circuit. The timing controller circuit is coupled to the display panel. The timing controller circuit is configured to process frame data to be displayed by the display panel. The processing circuit is coupled to the timing controller circuit. The processing circuit is configured to analyze an image including a face of a person to obtain adjustment information with respect to the light perceived by the face, so as to control the timing controller circuit to correspondingly adjust the frame data or at least one display characteristics associated with the frame data according to the adjustment information.

According to an embodiment of the invention, a display adjustment method of an electronic apparatus is provided. The electronic apparatus includes a display panel, a timing controller circuit and a processing circuit. The display adjustment method includes: processing, by the timing controller circuit, frame data to be displayed by the display panel; analyzing, by the processing circuit, an image including a face of a person to obtain adjustment information with respect to the light perceived by the face; and correspondingly adjusting, by the timing controller circuit, the frame data or at least one display characteristics associated with the frame data according to the adjustment information.

According to an embodiment of the invention, a display system is provided. The display system includes a first electronic apparatus and a second electronic apparatus. The first electronic apparatus has a processing circuit. The processing circuit is configured to analyze an image including a face of a person to obtain adjustment information with respect to the light perceived by the face. The second electronic apparatus has a timing controller circuit and a display panel. The timing controller circuit is coupled to the display panel to process frame data to be displayed by the display panel. The timing controller circuit correspondingly adjusts the frame data or at least one display characteristics associated with the frame data according to the adjustment information.

To sum up, the display system, the electronic apparatus and the display adjustment method thereof provided by the embodiments of the invention can analyze the image including the human face to obtain the adjustment information with respect to the light perceived by the face. According to the adjustment information, the display system, the electronic apparatus and the display adjustment method thereof can correspondingly adjust the frame data or the at least one display characteristics associated with the frame data. Therefore, the display system, the electronic apparatus and the display adjustment method thereof provided by the embodiments of the invention can correspondingly adjust the image presented in the display panel truly according to the light perceived by the user's face and/or eyes.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings

DESCRIPTION OF EMBODIMENTS

Figure 1:
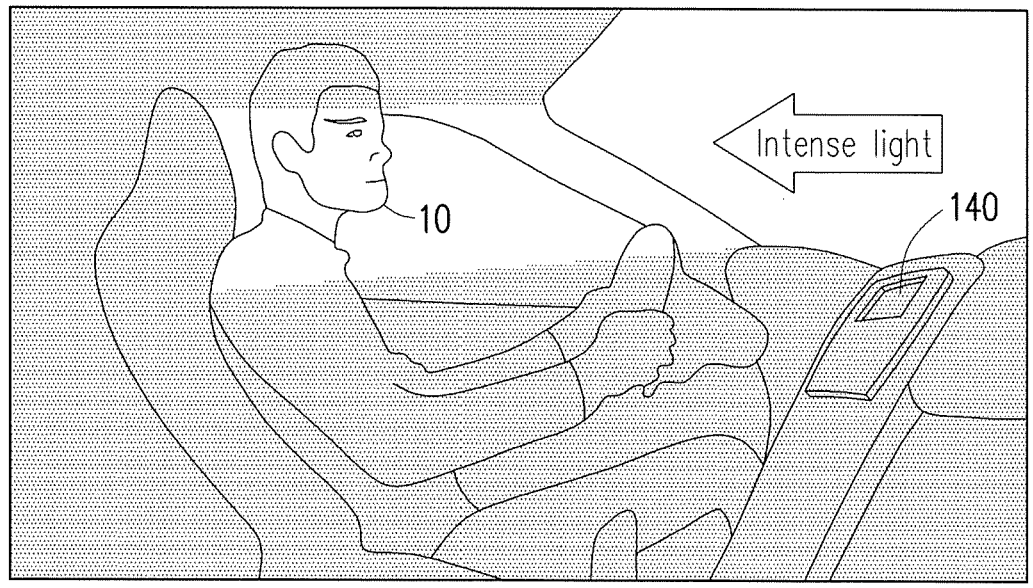
FIG. 1 is a schematic diagram illustrating a scenario that a user views a display panel of an electronic apparatus in a vehicle cockpit.

A term "couple (or connect)" used in the full text of the disclosure (including the claims) refers to any direct and indirect connections. For instance, if a first device is described to be coupled to a second device, it is interpreted as that the first device is directly coupled to the second device, or the first device is indirectly coupled to the second device through other devices or connection means. Moreover, wherever possible, components/members/steps using the same referral numerals in the drawings and description refer to the same or like parts. Components/members/steps using the same referral numerals or using the same terms in different embodiments may cross-refer related descriptions.

In some application scenarios, brightness of an environment where an electronic apparatus is located may be different from brightness perceived by a user's eyes. For example, FIG. 1 is a schematic diagram illustrating a scenario where a user views a display panel 140 of an electronic apparatus in a vehicle cockpit. The electronic apparatus may be, but not limited to, a mobile device mounted on the windshield by a holder, or an embedded navigation device. In the application scenario illustrated in FIG. 1, the electronic apparatus including the display panel 140 is a navigation device in a vehicle. The display panel 140 may be a liquid crystal display (LCD) panel, an organic light emitting diode (OLED) display panel or a display panel of other types.

When intense light (e.g., sunlight) is incident from outside a vehicle toward the front windshield into the cockpit, the car shell blocks most of the intense light. Thus, most of the cockpit area is still dark (by being compared with the environment outside the vehicle). However, there is still intense light passing through the front windshield and irradiating a small area of the cockpit. The intense light even irradiates the user's face 10 (and/or eyes) and makes the eyes feel flares. However, the surrounding of the display panel 140 stays dark as being compared with the surrounding of the user's face 10. When the display panel 140 is dynamically dimmed according to a degree of darkness in the vehicle cockpit, the dimmed display panel 140 is apparently unsuitable for the user to view because the eyes of the user in the cockpit must be adapted to the bright environment outside the vehicle. Thus, there is a need to adjust display characteristics such as backlight intensity of the display panel 140 according to the light perceived by the user's face 10 (and/or eyes), instead of only according to the ambient brightness detected by the light sensor in the front side of the electronic apparatus.

Figure 2:
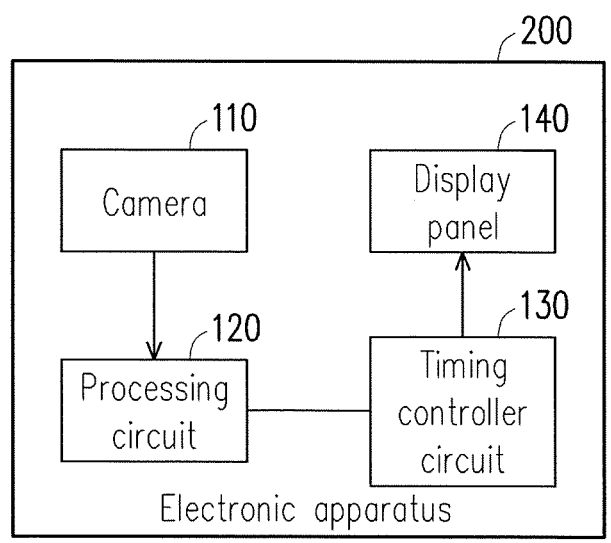
FIG. 2 is a schematic circuit block diagram illustrating a display system according to an embodiment of the invention.

FIG. 2 is a schematic circuit block diagram illustrating a display system according to an embodiment of the invention. The display system illustrated in FIG. 2 includes an electronic apparatus 200. According to a design requirement, the electronic apparatus 200 may be a handheld phone, a tablet computer, a notebook computer, an automotive multimedia apparatus, a vehicle navigation apparatus, a vehicle integrated dashboard module or any other electronic apparatus. The electronic apparatus 200 may include a camera 110, a processing circuit 120, a timing controller circuit 130 and a display panel 140. The timing controller circuit 130 is coupled to the display panel 140. The timing controller circuit 130 is configured to process frame data and transmit the flame data to the display panel 140. Based on the control of the timing controller circuit 130, the display panel 140 is configured to display images corresponding to the frame data provided by the timing controller circuit 130. The images shown on the display panel 140 may be images displayed by a requested application program, e.g., a navigation program. Thereby, the user may operate the electronic apparatus 200 and views the requested application program displayed by the display panel 140.

Figure 3A:
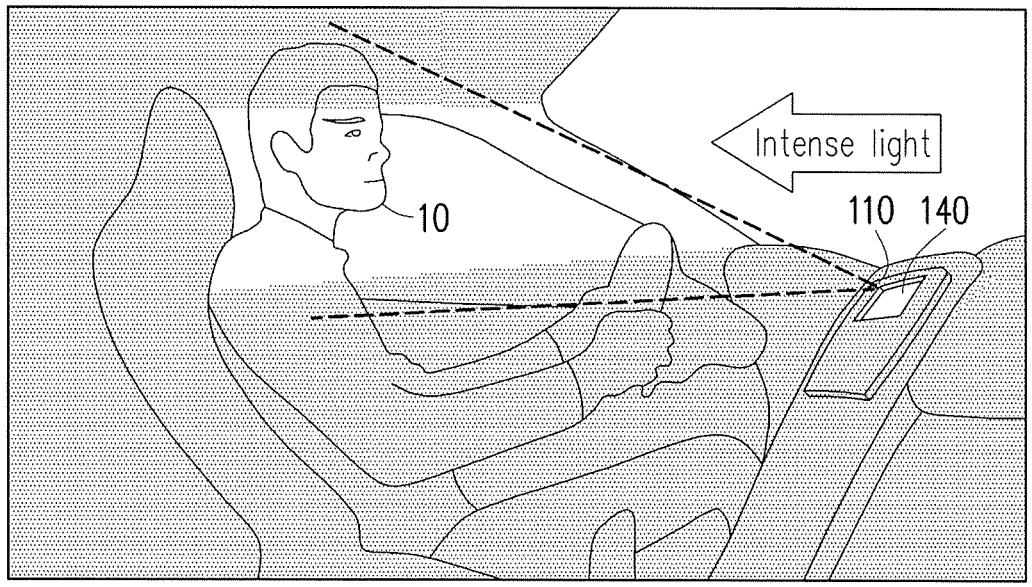
FIG. 3A is a schematic diagram illustrating a scenario that a user views a display panel of an electronic apparatus in a vehicle cockpit.

FIG. 3A is a schematic diagram illustrating a scenario that a user views a display panel of an electronic apparatus in a vehicle cockpit. The electronic apparatus 200 may be, but not limited to, a mobile phone mounted on the windshield of the vehicle by a holder, or a navigation device embedded in the vehicle (which is the example illustrated in FIG. 3A). The camera 110 and the display panel 140 are disposed at the same side of the electronic apparatus 200. That is, the camera 110 is a front-camera. Thus, the camera 110 may photograph an image 300 as illustrated in FIG. 3B, which may include image of the user's face 10.

Referring to FIG. 2, the processing circuit 120 is coupled to the camera 110 to receive the image captured by the camera 110. The processing circuit 120 is coupled to the timing controller circuit 130 to control the timing controller circuit 130 to adjust the frame data such as to adjust luminance information of the frame data, or one or more display characteristics associated with the frame data. For example, the display characteristics include backlight intensity for displaying the frame data. The processing circuit 120 may be a central processing unit (CPU), a micro-processor unit (MPU), a digital signal processor (DSP), a microcontroller or other computation circuits.

Figure 4:
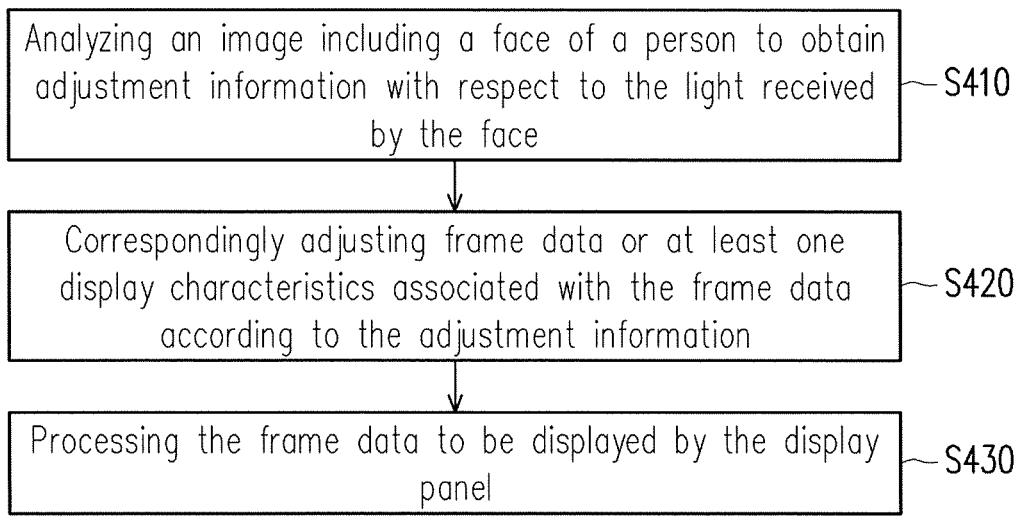
FIG. 4 is a flowchart illustrating a display adjustment method of an electronic apparatus according to an embodiment of the invention.

FIG. 4 is a flowchart illustrating a display adjustment method of an electronic apparatus according to an embodiment of the invention. The display adjustment method illustrated in FIG. 4 may be applicable to the display system illustrated in FIG. 2, FIG. 8 or FIG. 9. The display systems illustrated in FIG. 8 and FIG. 9 will be described in detail below.

Figure 3B:
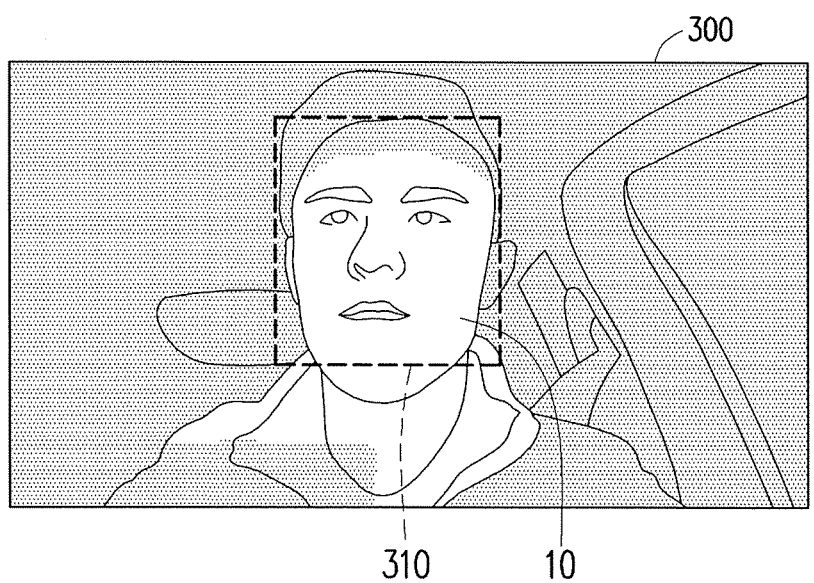
FIG. 3B is a schematic diagram illustrating an image including the user's face captured by the camera according to an embodiment of the invention.

Referring to FIG. 2 and FIG. 4, the processing circuit 120, in step S410, may analyze an image including a face 10 of a person (which is provided by the camera 110, for example, the exemplary image 300 illustrated in FIG. 3B), so as to obtain adjustment information with respect to light perceived by the face 10. For instance, the processing circuit 120 may perform face recognition on the image 300 illustrated in FIG. 3B, so as to retrieve a face area 310 including the user's face 10 from the image 300. The present embodiment does not intend to limit implementation details with respect to the face recognition. In some embodiments, the face recognition utilizes a conventional face recognition algorithm or other algorithms. After the face area 310 including the user's face 10 is retrieved, the processing circuit 120 may analyze the face area 310 to obtain luminance information of the face area 310 as an analysis result. The processing circuit 120 may correspondingly determine the adjustment information according to the analysis result.

In other embodiments, the processing circuit 120 may perform eye recognition on the image 300 illustrated in FIG. 3B, so as to retrieve an eye area including the user's eyes from the captured image. In some embodiments, the eye recognition may utilize a conventional eye recognition algorithm or other algorithms. After the eye area is retrieved, the processing circuit 120 may analyze the eye area to obtain a pupil diameter of the eyes as an analysis result. Based on physiological characteristics, the user's pupil diameter may indicate the light perceived by the user's face 10. According to the analysis result (i.e., according to the size of the pupil diameter), the processing circuit 120 may correspondingly determine the adjustment information.

In step S420, the processing circuit 120 may control the timing controller circuit 130 according to the adjustment information. In detail, the processing circuit 120 outputs the adjustment information to the timing controller circuit 130 and the timing controller circuit 130 may correspondingly adjust the frame data to be displayed by the display panel 140 according to the adjustment information. For example, the timing controller circuit 130 may correspondingly adjust luminance, contrast, sharpness, chrominance, a GAMMA curve of the frame data to be displayed by the display panel 140, according to information of the light perceived by the user's face 10 included in the image 300. Alternatively, the timing controller circuit 130 may correspondingly adjust one or more display characteristics associated with the frame data, such as the backlight intensity of the display panel 140 for displaying the frame data. In step S430, the timing controller circuit 130 may process the frame data to be displayed by the display panel 140.

For example, in an exemplary scenario as illustrated in FIG. 3A and FIG. 3B, the user's face 10 is irradiated by the light and becomes bright, but the background (e.g., the vehicle cockpit) which is not directly irradiated by the sunlight is relatively dark. In this case, the backlight intensity (i.e., one of the display characteristics) of the display panel 140 may be dynamically adjusted to be bright according to the adjustment information that is obtained based on the information of the light perceived by the user's face 10 (and/or eyes) included in the image 300, which facilitates the user to view. By contrast, the electronic apparatus of the related art placed in the vehicle cockpit may dynamically dim the backlight of the display panel according to the dark vehicle cockpit detected by the light sensor in the front side of the electronic apparatus (instead of according to the light perceived by the user's face 10). Because the brightness of the cockpit is less than that of the outside of the vehicle, the electronic apparatus of the related art may dynamically dim the backlight intensity of the display panel. Certainly, the eyes feel flares and encounter difficulty in viewing the image shown on the dimmed display panel.

In other embodiments, the source driver of the display panel 140 performs gamma correction by changing the gamma voltages of the digital-to-analog converter (DAC) in the source driver. In step S420, the timing controller circuit 130 may correspondingly adjust the gamma voltages of the DAC in the source driver of the display panel 140, so as to correspondingly adjust display characteristics associated with the frame data.

Figure 5:
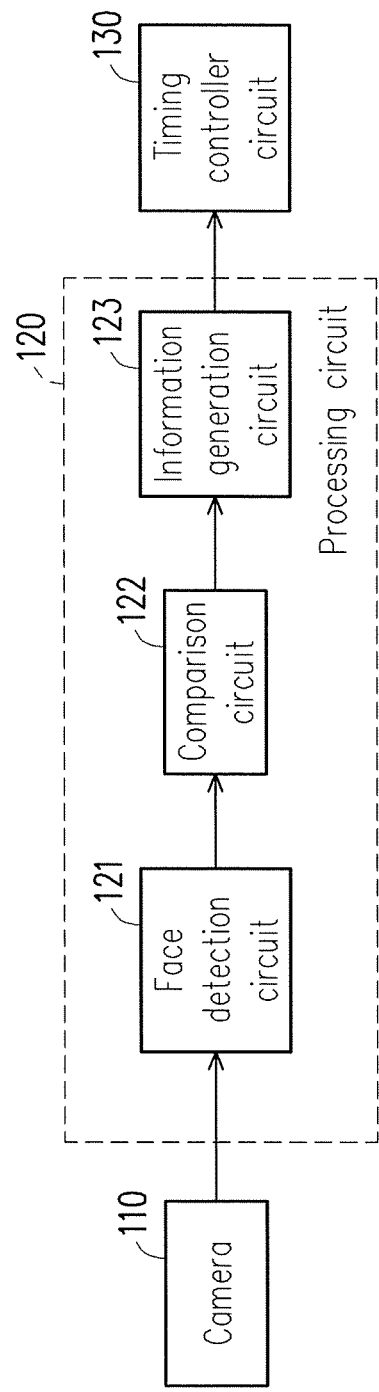
FIG. 5 is a schematic circuit block diagram illustrating the processing circuit according to an embodiment of the invention.

FIG. 5 is a schematic circuit block diagram illustrating the processing circuit 120 according to an embodiment of the invention. Description related to the processing circuit 120 illustrated in FIG. 5 may be applicable to the processing circuit 120 illustrated in FIG. 2, FIG. 8 or FIG. 9. In the embodiment illustrated in FIG. 5, the processing circuit 120 includes a face detection circuit 121, a comparison circuit 122 and an information generation circuit 123. The face detection circuit 121 receives an image (e.g., the exemplary image 300 illustrated in FIG. 3B) provided by the camera 110. The face detection circuit 121 is may detect the user's face 10 from the image. The face detection circuit 121 may also analyze a face area (e.g., the face area 310 included in the exemplary image 300 illustrated in FIG. 3B) with respect to the user's face 10 to obtain luminance information of the face area. The face detection circuit 121 may provide the luminance information to the comparison circuit 122. In the embodiment illustrated in FIG. 5, the comparison circuit 122 is coupled to the face detection circuit 121 to receive the luminance information of the face area (e.g., the face area 310 included in the exemplary image 300 illustrated in FIG. 3B). For instance (but not limited to), the luminance information of the face area 310 may be an average luminance value of the face area 310 generated by averaging luminance Y of (Y, U, V) information of all pixel data of the face area 310. It should be noted that the luminance information of the face area 310 is not the average luminance value of the entire image 300 illustrated in FIG. 3B. The comparison circuit 122 may compare the luminance information of the face area with a specific threshold, so as to obtain a comparison result. For instance, the comparison result may be a difference between the luminance information of the face area 310 and the threshold, or may be a value corresponding to the difference. The threshold may an arbitrary fixed value determined according to a design requirement. Based on the comparison result, the comparison circuit 122 may directly or indirectly control the timing controller circuit 130 to correspondingly adjust frame data or at least one display characteristics associated with the frame data. In an example, the threshold used in the comparison circuit 122 may an average luminance value of the entire image (e.g., the image 300). In another example, the threshold used in the comparison circuit 122 is an average luminance value of a remained image after the face area (e.g., the face area 310) is excluded from the image (e.g., the image 300).

In the embodiment illustrated in FIG. 5, the information generation circuit 123 is coupled between the comparison circuit 122 and the timing controller circuit 130. The information generation circuit 123 may receive the comparison result from the comparison circuit 122. Based on the comparison result, the information generation circuit 123 may obtain the adjustment information in step S410. For instance (but not limited to), the information generation circuit 123 may convert the comparison result (which refers to the difference between the luminance information of the face area and the threshold) into a corresponding the adjustment information according to a predetermined mapping relationship (i.e., adjustment information versus the comparison result). The information generation circuit 123 may provide the adjustment information to the timing controller circuit 130 to correspondingly adjust frame data, e.g., to adjust the luminance Y of (Y, U, V) information of pixel data of the frame data, or to adjust the at least one display characteristics (e.g., the backlight intensity of the display panel 140 or other characteristics) associated with the frame data.

In some embodiments, the information generation circuit 123 may also check a relationship between a tolerance value and the comparison result (e.g., the difference between the luminance information of the face area and the threshold) provided by the comparison circuit 122. When the information generation circuit 123 determines that the comparison result is less than the tolerance value, the information generation circuit 123 does not generate the adjustment information (or generate zero adjustment information). The information generation circuit 123 converts the comparison result into the corresponding adjustment information only when the comparison result is greater than the tolerance value.

Figure 6:
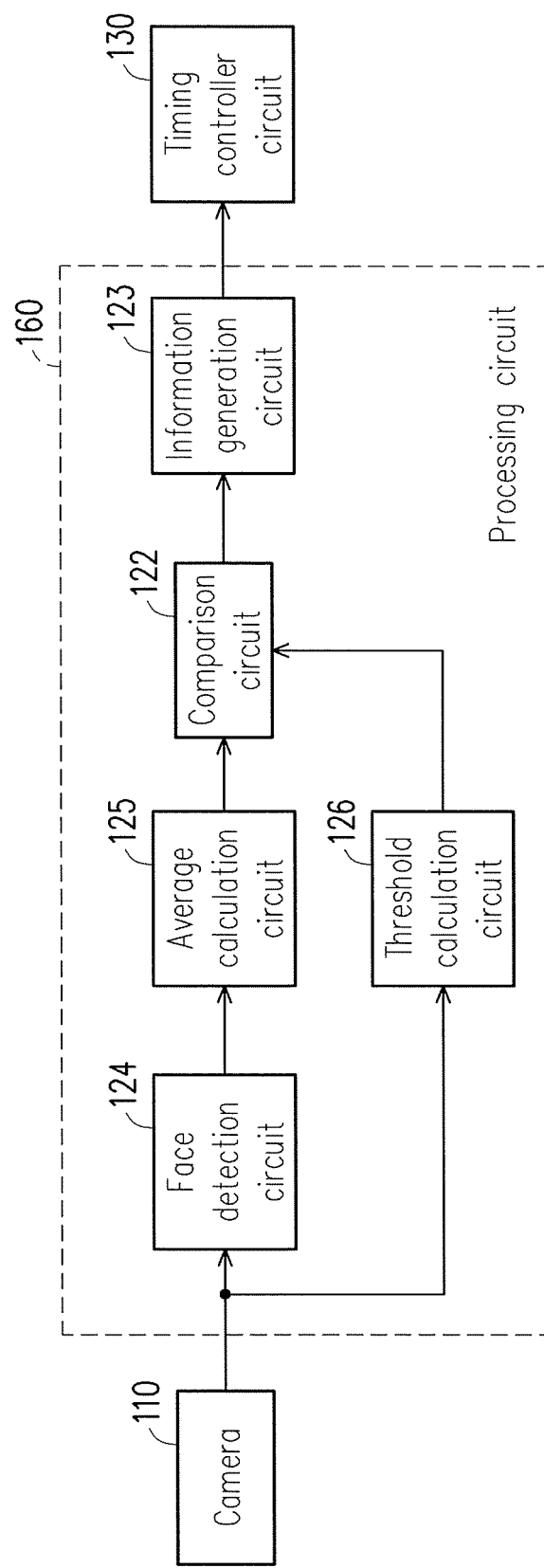
FIG. 6 is a schematic circuit block diagram illustrating the processing circuit according to another embodiment of the invention.

FIG. 6 is a schematic circuit block diagram illustrating a processing circuit 160 according to another embodiment of the invention. The processing circuit 120 illustrated in FIG. 2, FIG. 8 or FIG. 9 may be replaced by the processing circuit 160 illustrated in FIG. 6. In the embodiment illustrated in FIG. 6, the processing circuit 160 includes a face detection circuit 124, an average calculation circuit 125, a threshold calculation circuit 126, a comparison circuit 122, and an information generation circuit 123. The comparison circuit 122 and the information generation circuit 123 illustrated in FIG. 6 may be referred according to descriptions related to the comparison circuit 122 and the information generation circuit 123 illustrated in FIG. 5 and thus, will not be repeated.

In the embodiment illustrated in FIG. 6, the face detection circuit 124 may provide luminance information of each pixel data of a face area (e.g., the face area 310 included in the exemplary image 300 illustrated in FIG. 3B) with respect to the user's face 10 to the average calculation circuit 125. The average calculation circuit 124 is coupled to the face detection circuit 124 to receive the luminance information of each pixel data of the face area from the face detection circuit 124. The average calculation circuit 125 may calculate an average luminance value of the face area by averaging a plurality of luminance information of a plurality of pixel data of the face area. The average calculation circuit 125 is coupled to the comparison circuit 122 to provide the average luminance value of the face area to the comparison circuit 122.

The threshold calculation circuit 126 is coupled to the camera 110 to receive an image captured by the camera 110. The threshold calculation circuit 126 is configured to analyze the image provided by the camera 110 to obtain luminance information of the image and then determine a threshold, which is a dynamic threshold, according to the luminance information of the image. For instance, in some embodiments, the threshold calculation circuit 126 may calculate an average luminance value of a plurality of pixel data of the entire image (e.g., the exemplary image 300 illustrated in FIG. 3B) provided by the camera 110 and take the average luminance value of the entire image as the threshold used in the comparison circuit 122. In some other embodiments, the threshold calculation circuit 126 may calculate an average luminance value of a plurality of pixel data of a remained image excluding the face area 310 from the exemplary image 300 illustrated in FIG. 3B. The threshold calculation circuit 126 may calculate an average luminance value of the remained image and take the average luminance value of the remained image as the threshold used in the comparison circuit 122. The threshold calculation circuit 126 is coupled to the comparison circuit 122 to provide the threshold (which is the dynamic threshold) to the comparison circuit 122.

The comparison circuit 122 may compare the average luminance value of the face area 310 (which is provided by the average calculation circuit 125) and the dynamic threshold (which is provided by the threshold calculation circuit 126), so as to obtain a comparison result. Based on the comparison result, the comparison circuit 122 may directly or indirectly control the timing controller circuit 130 to correspondingly adjust frame data or at least one display characteristics associated with the frame data.

Figure 7:
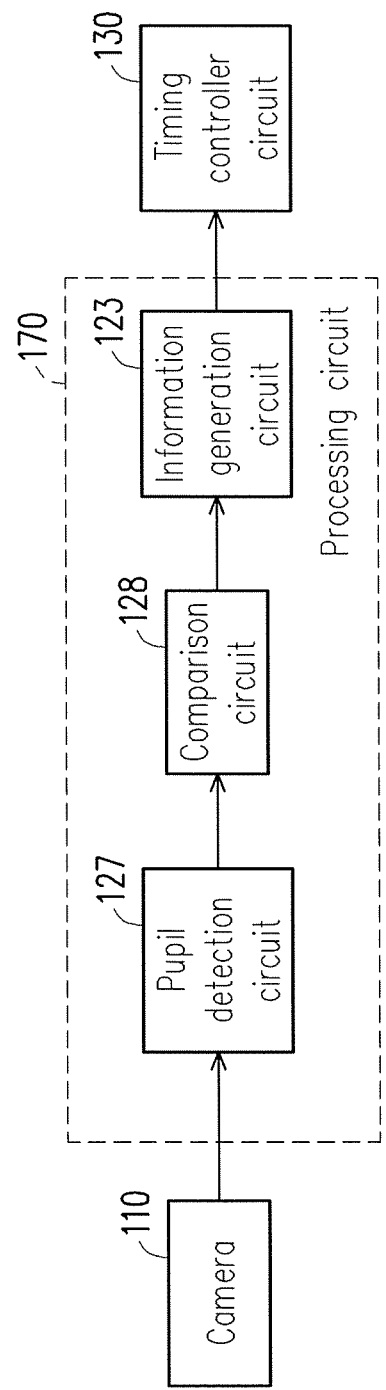
FIG. 7 is a schematic circuit block diagram illustrating the processing circuit according to yet another embodiment of the invention.

FIG. 7 is a schematic circuit block diagram illustrating the processing circuit 170 according to yet another embodiment of the invention. The processing circuit 120 illustrated in FIG. 2, FIG. 8 or FIG. 9 may be replaced by the processing circuit 170 illustrated in FIG. 7. In the embodiment illustrated in FIG. 7, the processing circuit 170 includes a pupil detection circuit 127, a comparison circuit 128 and an information generation circuit 123. The comparison circuit 128 and the information generation circuit 123 illustrated in FIG. 7 may be referred according to descriptions related to the comparison circuit 122 and the information generation circuit 123 illustrated in FIG. 5 and thus, will not be repeated.

In the embodiment illustrated in FIG. 7, the pupil detection circuit 127 receives an image (e.g., the exemplary image 300 illustrated in FIG. 3B) provided by the camera 110. The pupil detection circuit 127 may detect at least one pupil of the user from the image to obtain a pupil diameter. According to a design requirement, the pupil detection circuit 127 may utilize a conventional eye recognition algorithm or other algorithms to obtain the pupil diameter. The comparison circuit 128 is coupled to the pupil detection circuit 127 to receive the pupil diameter. The comparison circuit 128 may compare the pupil diameter with a specific threshold, so as to obtain a comparison result. The threshold may be an arbitrary fixed value determined according to a design requirement. Based on the comparison result, the comparison circuit 128 may directly or indirectly control the timing controller circuit 130 to correspondingly adjust the frame data or the at least one display characteristics associated with the frame data.

Figure 8:
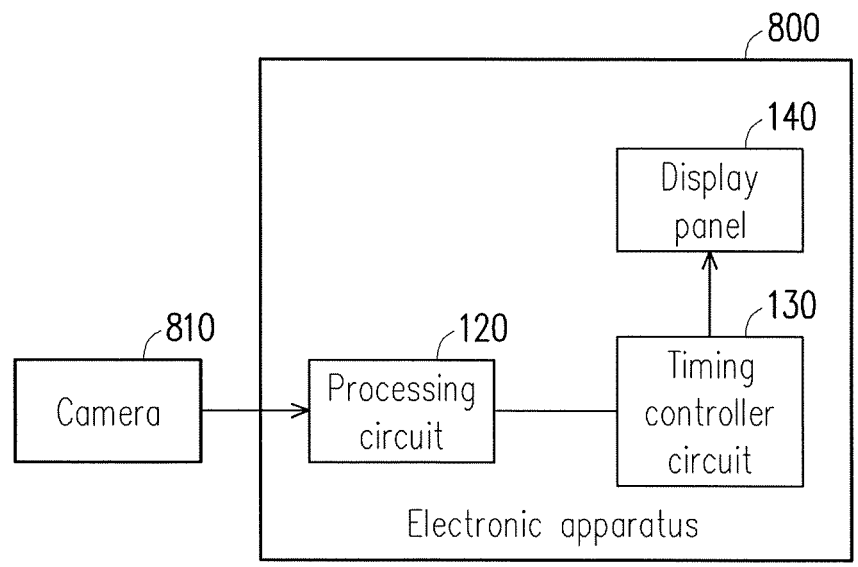
FIG. 8 is a schematic circuit block diagram illustrating a display system according to another embodiment of the invention.

FIG. 8 is a schematic circuit block diagram illustrating a display system according to another embodiment of the invention. The display system illustrated in FIG. 8 includes a camera 810 and an electronic apparatus 800. Being different from the embodiment illustrated in FIG. 2, the camera 810 illustrated in FIG. 8 may be physically separated from the electronic apparatus 800 and be able to establish a communication with the electronic apparatus 800. The electronic apparatus 800 may be a handheld phone, a tablet computer, a notebook computer, an automotive multimedia apparatus, a vehicle navigation apparatus, a vehicle integrated dashboard module or any other electronic apparatus. The electronic apparatus 800 may include a processing circuit 120, a timing controller circuit 130 and a display panel 140.

According to a design requirement and an application demand, the camera 810 may be disposed anywhere outside the electronic apparatus 800 and may photograph the user's face 10 and/or eyes. Taking the scenario illustrated in FIG. 3A as an example, the camera 810 may be installed in the embedded navigation device. In another embodiment, the camera 810 may be mounted on the frame of a rear view mirror. In some other embodiments, the user may wear a spectacle frame on his/her face 10, and the camera 810 may be disposed on this spectacle frame to photograph the user's face 10 and/or eyes.

The camera 810 may be connected to the processing circuit 120 through a wired communication interface and/or a wireless communication interface. Thus, the processing circuit 120 may receive an image captured by the camera 810. The processing circuit 120, the timing controller circuit 130 and the display panel 140 illustrated in FIG. 8 may be referred according to the descriptions related to those illustrated in FIG. 2 and thus, will not be repeated.

Figure 9:
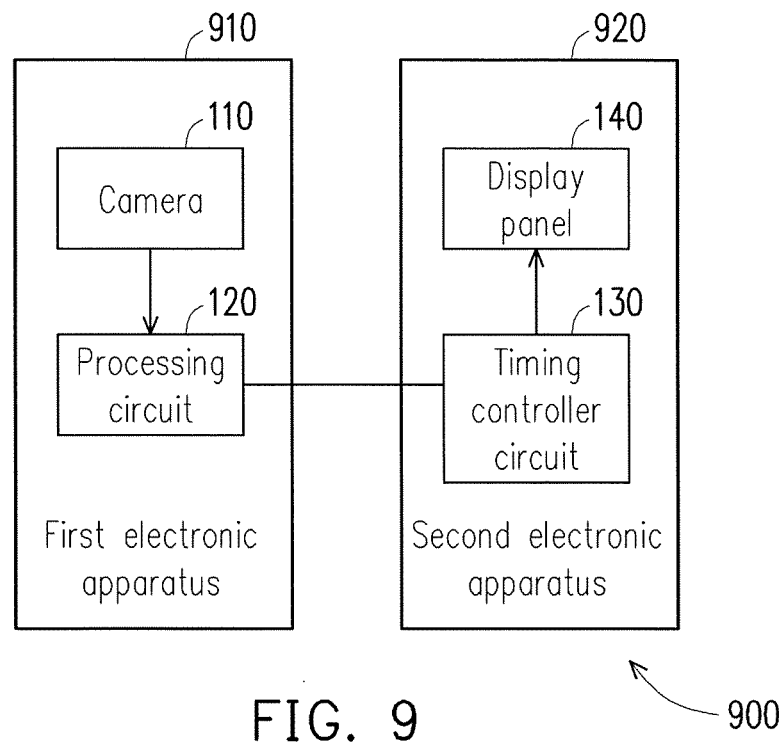
FIG. 9 is a schematic circuit block diagram illustrating a display system according to yet another embodiment of the invention.

FIG. 9 is a schematic circuit block diagram illustrating a display system 900 according to yet another embodiment of the invention. The display system 900 illustrated in FIG. 9 includes a first electronic apparatus 910 and a second electronic apparatus 920. The first electronic apparatus 910 and the second electronic apparatus 920 may be a handheld phone, a tablet computer, an automotive multimedia apparatus, a vehicle navigation apparatus, a vehicle integrated dashboard module or any other electronic apparatus. The first electronic apparatus 910 may include a camera 110 and the processing circuit 120, and the second electronic apparatus 920 may include a timing controller circuit 130 and a display panel 140.

The processing circuit 120 of the first electronic apparatus 910 is coupled to the camera 110 to receive an image captured by the camera 110. The processing circuit 120 may analyze the image including a user's face 10 to obtain adjustment information with respect to light perceived by the face 10. The processing circuit 120 of the first electronic apparatus 910 may be connected to the timing controller circuit 130 of the second electronic apparatus 920 through a wired communication interface and/or a wireless communication interface. The processing circuit 120 may control the timing controller circuit 130 according to the adjustment information. The timing controller circuit 130 may process frame data to be displayed by the display panel 140 based on the control of the processing circuit 120. The camera 110, the processing circuit 120, the timing controller circuit 130 and the display panel 140 illustrated in FIG. 9 may be referred according to the descriptions related to those illustrated in FIG. 2 and thus, will not be repeated. Thus, frame data or display characteristics (e.g., backlight intensity) of the display panel 140 for displaying the frame data may be dynamically adjusted according to the information of the light perceived by the face 10 included in the image.

It should be noted that in different application scenarios, functions related to the processing circuit 120 and/or the timing controller circuit 130 may be implemented in a combination of software, firmware and/or hardware by employing general programming languages (e.g., C or C++), hardware description languages (e.g., Verilog HDL or VHDL) or other suitable programming languages. The software (or firmware) capable of executing the functions may be deployed in any computer-accessible media, such as magnetic tapes, semiconductor memories, magnetic disks or compact disks (e.g., CD-ROM or DVD-ROM) or may be delivered through the Internet, wired communication, wireless communication or other communication media. The software (or firmware) may be stored in the computer-accessible media for a processor of the computer to access/execute the programming codes of the software (or firmware). Moreover, the apparatus and the method of the invention may be implemented by means of a combination of hardware and software.

In view of the foregoing, the display system, the electronic apparatus and the display adjustment method thereof provided by the embodiments of the invention can analyze the image including the human face to obtain the adjustment information with respect to the light perceived by the face. According to the adjustment information, the display system, the electronic apparatus and the display adjustment method thereof can correspondingly adjust the frame data or the at least one display characteristics associated with the frame data. Therefore, the display system, the electronic apparatus and the display adjustment method thereof provided by the embodiments of the invention can correspondingly adjust the image presented by the display panel truly according to information of the light perceived by the user's face and/or eyes included in the image. Because the light perceived by the user's face is intense light, the display system, the electronic apparatus and the display adjustment method thereof provided by the embodiments of the invention can dynamic increase the luminance of frame data or dynamically increase the backlight intensity (or other display characteristics) of the display panel 140 to facilitate the user to view. By contrast, the electronic apparatus of the related art dynamically adjusts the backlight intensity of the display panel according to the degree of darkness of the vehicle cockpit (instead of according to the light perceived by the user's face).

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An electronic apparatus, comprising:
a display panel;
a timing controller circuit, coupled to the display panel, and configured to process frame data to be displayed by the display panel; and
a processing circuit, coupled to the timing controller circuit, and configured to analyze an image including a face of a person to obtain adjustment information with respect to the light perceived by the face, so as to control the timing controller circuit to correspondingly adjust the frame data or at least one display characteristic associated with the frame data according to the adjustment information,
wherein the processing circuit comprises:
a comparison circuit, configured to compare an average luminance value of a face area in the image with a threshold, so as to obtain a comparison result used to control the timing controller circuit to correspondingly adjust the frame data or the at least one display characteristic associated with the frame data, wherein the threshold is an average luminance value of the image.

2. The electronic apparatus according to claim 1, wherein the processing circuit further comprises:

a face detection circuit, receiving the image, and configured to detect the face area with respect to the person in the image to obtain luminance information of the face area.

3. The electronic apparatus according to claim 2, wherein the processing circuit further comprises:
an information generation circuit, coupled to the comparison circuit, and configured to obtain the adjustment information based on the comparison result.

4. The electronic apparatus according to claim 2, wherein the processing circuit further comprises:
an average calculation circuit, coupled to the face detection circuit and the comparison circuit, and configured to calculate the average luminance value of the face area according to the luminance information of the face area; and
a threshold calculation circuit, coupled to the comparison circuit, and configured to determine the threshold according to luminance information of the image.

5. The electronic apparatus according to claim 2, wherein the threshold is an average luminance value of the entire image.

6. The electronic apparatus according to claim 2, wherein the threshold is an average luminance value of a remained image after the face area is excluded from the image.

7. The electronic apparatus according to claim 1, wherein the at least one display characteristic comprises a backlight intensity for displaying the frame data.

8. A display adjustment method of an electronic apparatus, wherein the electronic apparatus comprises a display panel, a timing controller circuit and a processing circuit, the display adjustment method comprising:
processing, by the timing controller circuit, frame data to be displayed by the display panel;
analyzing, by the processing circuit, an image including a face of a person to obtain adjustment information with respect to the light perceived by the face;
comparing an average luminance value of a face area with a threshold, so as to obtain a comparison result used to correspondingly adjust the frame data or at least one display characteristic associated with the frame data, wherein the threshold is an average luminance value of the image; and
correspondingly adjusting, by the timing controller circuit, the frame data or the at least one display characteristic associated with the frame data according to the adjustment information.

9. The display adjustment method according to claim 8, further comprising:
detecting the face area with respect to the person in the image to obtain luminance information of the face area.

10. The display adjustment method according to claim 9, wherein the step of obtaining the adjustment information comprises:
obtaining the adjustment information based on the comparison result.

11. The display adjustment method according to claim 9, further comprising:
calculating the average luminance value of the face area according to the luminance information of the face area; and
determining the threshold according to luminance information of the image.

12. The display adjustment method according to claim 9, wherein the threshold is an average luminance value of the entire image.

13. The display adjustment method according to claim 9, wherein the threshold is an average luminance value of a remained image after the face area is excluded from the image.

14. The display adjustment method according to claim 8, wherein the at least one display characteristic comprises a backlight intensity for displaying the frame data.

15. The display adjustment method according to claim 8, wherein adjusting the frame data comprises adjusting luminance information of the frame data.

16. A display system, comprising:
a first electronic apparatus, comprising a processing circuit configured to analyze an image including a face of a person to obtain adjustment information with respect to the light perceived by the face; and
a second electronic apparatus, comprising a display panel and a timing controller circuit, wherein the timing controller circuit is coupled to the display panel to process frame data to be displayed by the display panel, and the timing controller circuit correspondingly adjusts the frame data or at least one display characteristic associated with the frame data according to the adjustment information,
wherein the processing circuit comprises:
a comparison circuit, configured to compare an average luminance value of a face area in the image with a threshold, so as to obtain a comparison result used to control the timing controller circuit to correspondingly adjust the frame data or the at least one display characteristic associated with the frame data, wherein the threshold is an average luminance value of the image.

17. The display system according to claim 16, wherein the processing circuit comprises:
a face detection circuit, receiving the image, and configured to detect the face area with respect to the person in the image to obtain luminance information of the face area.

18. The display system according to claim 17, wherein the processing circuit further comprises:
an information generation circuit, coupled to the comparison circuit, and configured to obtain the adjustment information based on the comparison result.

19. The display system according to claim 17, wherein the processing circuit further comprises:
an average calculation circuit, coupled to the face detection circuit and the comparison circuit, and configured to calculate the average luminance value of the face area according to the luminance information of the face area; and
a threshold calculation circuit, coupled to the comparison circuit, and configured to determine the threshold according to luminance information of the image.

20. The display system according to claim 17, wherein the threshold is an average luminance value of the entire image.

21. The display system according to claim 17, wherein the threshold is an average luminance value of the image after the face area is excluded from the image.

22. The display system according to claim 16, wherein the at least one display characteristic comprises a backlight intensity for displaying the frame data.

* * * * *